No. 848,618. PATENTED APR. 2, 1907.
L. A. ANSON.
APPARATUS FOR COOLING LIQUIDS.
APPLICATION FILED JAN. 17, 1905.
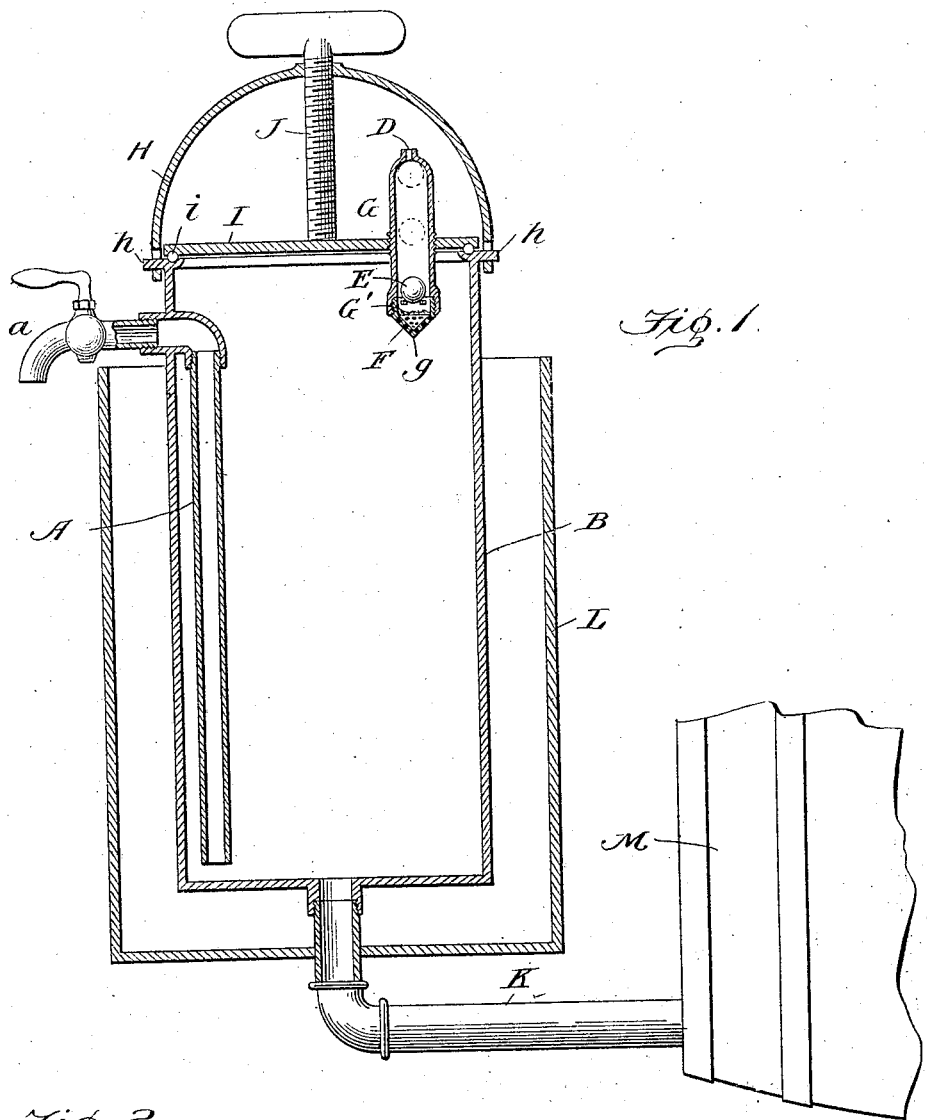
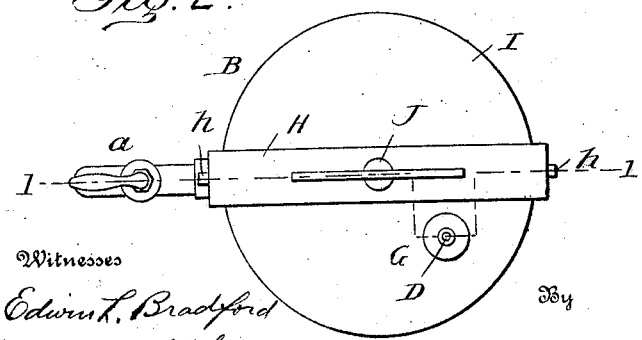

UNITED STATES PATENT OFFICE.

LORENZO A. ANSON, OF CLEVELAND, OHIO, ASSIGNOR OF ONE-HALF TO JOHN C. MEYERS, OF CLEVELAND, OHIO.

APPARATUS FOR COOLING LIQUIDS.

No. 848,618.

Specification of Letters Patent.

Patented April 2, 1907.

Application filed January 17, 1905. Serial No. 241,518.

*To all whom it may concern:*

Be it known that I, LORENZO A. ANSON, a citizen of the United States, residing at Cleveland, in the county of Cuyahoga and State of Ohio, have invented certain new and useful Improvements in Apparatus for Cooling Liquids, of which the following is a specification, reference being had therein to the accompanying drawings.

My invention relates to apparatus for cooling liquids, such as beer, the apparatus being situated intermediate the storage or supply vessel or receptacle and the faucet or cock through which the liquid is drawn; and it has for its object to improve apparatus of this character.

Figure 1 is a view, partly in elevation and partly in vertical section on the dotted line 1 1 of Fig. 2, of a beer-cooler embodying my improvements. Fig. 2 is a top plan view of the same.

In the drawings, B represents a vessel that is adapted to be set into an ice-receptacle L or other cooler. It is connected by a pipe K with a beer-barrel M or other liquid-receptacle, the pipe by preference entering the vessel through its bottom.

A represents the pipe or tube through which the cooled beer is drawn from the vessel, it being provided with a cock or faucet $a$ of an approved construction. The pipe A preferably extends almost or quite to the bottom of the vessel B, where its end is left open, and passes out through its wall below the upper edge thereof. The upper open end of the vessel B is adapted to be closed by a cover I, to hold which in place I employ a screw J, that is mounted in a bail or arch-piece H. This bail has a jointed or hinge connection with the vessel, being secured thereto by lugs $h$, that pass through apertures in the ends of the bail. A gasket or packing $i$ is preferably employed between the cover I and the upper edge of the vessel.

The vessel B is provided with an automatic vent and relief valve G to permit its being filled with the liquid from the supply or storage receptacle M and also to cause an even and steady flow through the delivery-pipe whenever the valve therein is opened. It may be stated that the contents of the barrel M or other supply-vessel connected with the cooling-vessel B flows freely into the latter whenever opportunity offers, either by gravity incident to the vessel M being at a higher level than the vessel B or because the liquid in the vessel M is acted upon by an elastic gas under pressure.

The valve G is mounted in the cover I so as to be easily separable from the vessel for repairs or cleaning. It has a cylindrical casing, in the upper portion of which is a vent-hole D, that is closed by a float E, contained within the casing, whenever the cooling vessel B is filled. A grating or strainer G' is arranged within the casing near its lower end and above the openings F therein in order to catch any sediment that may enter the valve and prevent clogging of the float. The lower portion $g$ of the valve-casing, in which are formed the openings F and carrying the strainer G, is separable from the main body portion thereof to permit access to the interior of the valve for cleaning or other purposes, the connection between the two parts being preferably by means of a screw-threaded joint.

By making the cooling vessel open-ended and carrying both the supply and delivery pipes K and A through the walls thereof below the open end I am enabled to employ an easily-removable cover or closure, such as represented at I, that when taken off gives free access to the interior of the vessel and does this without disturbing any of the pipe connections.

The vent-valve acts to permit the air originally contained within the vessel after the cover has been applied to escape when the liquid is turned on through the supply-pipe K. As soon as the vessel B is full the float is raised by the liquid entering the valve-casing through the openings F until it closes the vent-opening D, when further flow through the supply-pipe will cease. Whenever the liquid is drawn off from the cooling vessel through the pipe A, the float falls away from the opening D, and the vessel therefore has vent at this place, causing an easy and smooth flow of the liquid. As soon as the flow through the pipe A ceases the vessel will be filled from the barrel M or other supply source until the float again closes the vent D.

What I claim as new, and desire to secure by Letters Patent, is—

In a liquid-cooling apparatus, the combination of a cooling vessel, supply and exhaust pipes passing into the said vessel and an automatic relief and vent valve comprising a tubular casing extending from the interior to the exterior of said vessel and having a vent-aperture at its outer end, a perforated portion removably secured to the interior end of said casing, a float within the casing adapted to close said vent-aperture and a grating secured to said casing at its interior end and accessible upon removal of said perforated portion, substantially as described.

In testimony whereof I affix my signature in presence of two witnesses.

LORENZO A. ANSON.

Witnesses:
CHARLES B. SOLDERS,
GEORGE BERNARD SOLDERS.